April 2, 1957     S. J. POPEIL     2,787,308
FOOD CHOPPER
Filed July 18, 1956     3 Sheets-Sheet 1
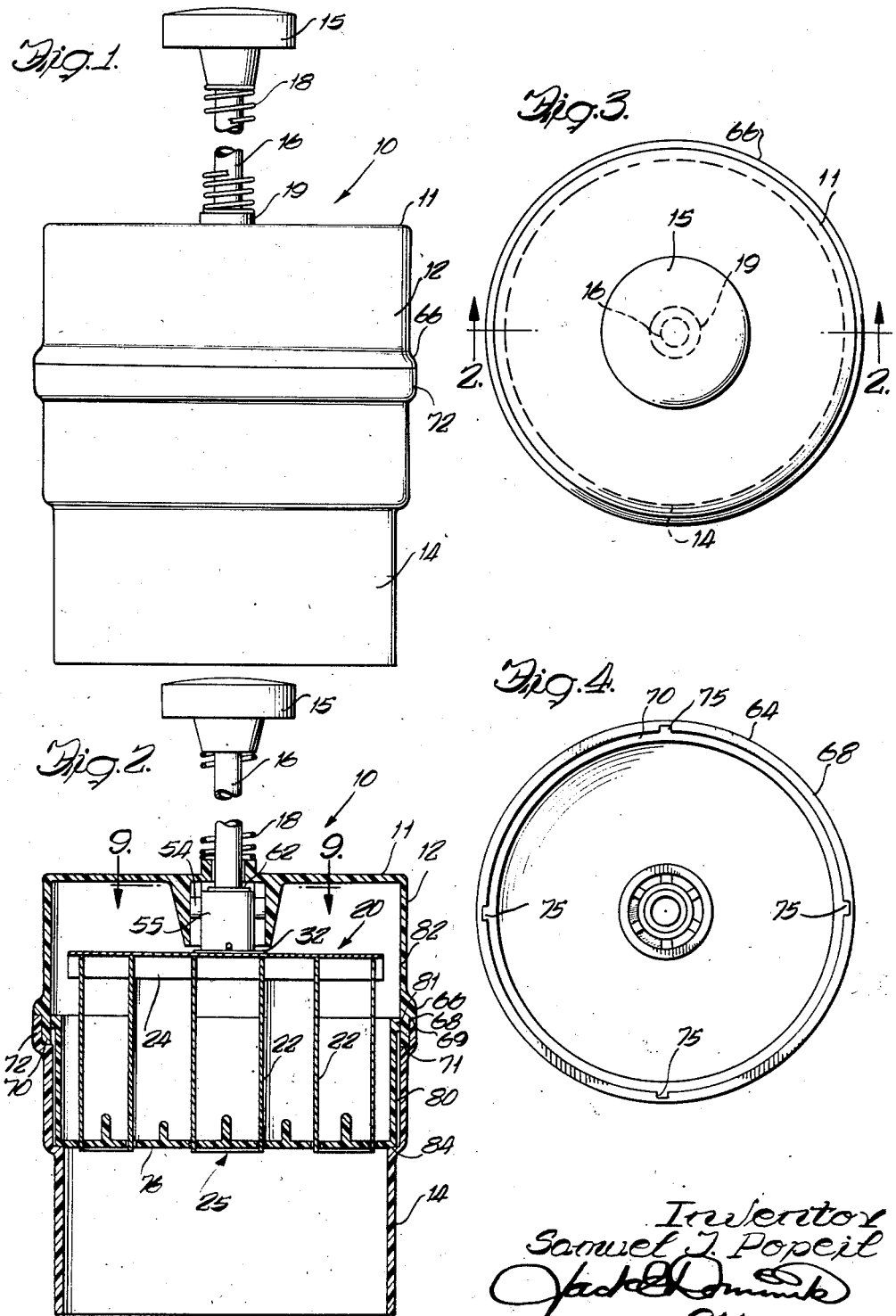

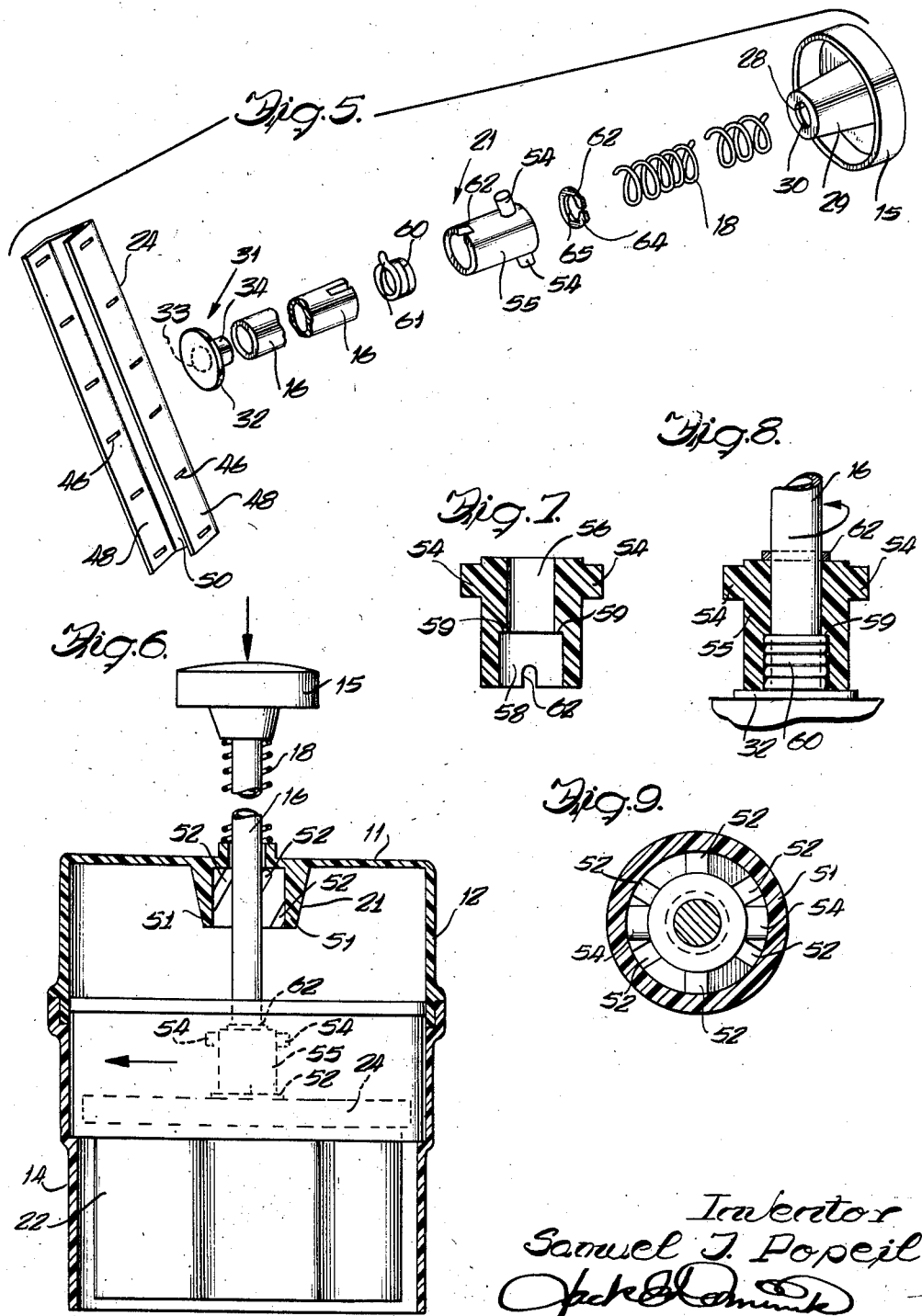

April 2, 1957　　　　S. J. POPEIL　　　　2,787,308
FOOD CHOPPER
Filed July 18, 1956　　　　　　　　　　3 Sheets-Sheet 3
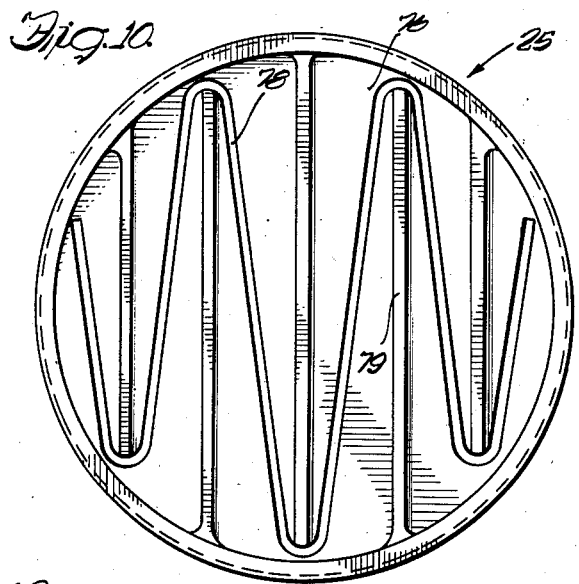
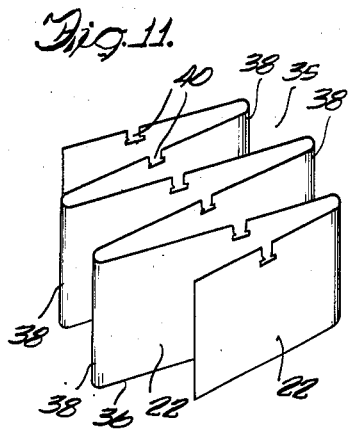
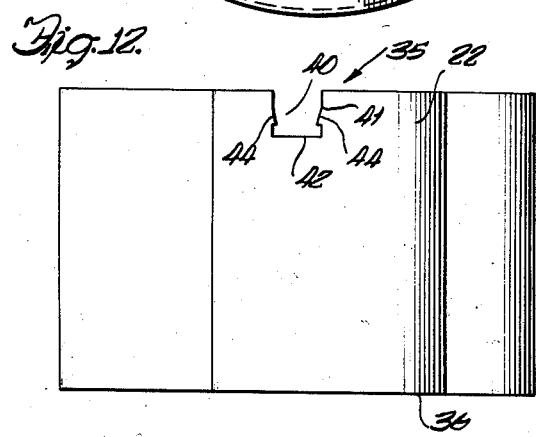
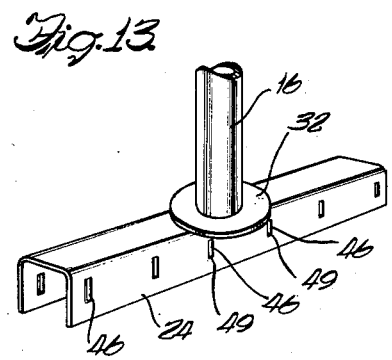
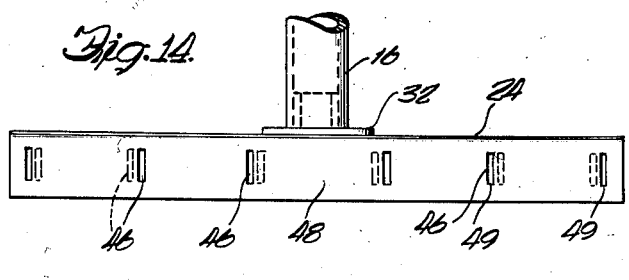
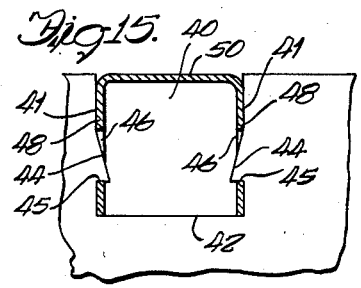
Inventor
Samuel J. Popeil
Attorney United States Patent Office 2,787,308
Patented Apr. 2, 1957

2,787,308

FOOD CHOPPER

Samuel J. Popeil, Chicago, Ill.

Application July 18, 1956, Serial No. 598,662

5 Claims. (Cl. 146—160)

The present invention relates to a food chopper, and relates particularly to structural improvements in the product to facilitate manufacture, reduce cost, and increase durability.

A wide variety of food choppers are known and in use. Many more have been proposed, but for a multitude of reasons have never found their way into production. The majority of the known food choppers contemplate a housing, a vertical drive shaft, and a blade assembly secured to the drive shaft. The present invention relates particularly, although not exclusively, to the blade assembly, drive shaft, and mechanism for securing the drive shaft to the housing.

The general object of the invention is to provide a food chopper of an improved construction which greatly reduces its cost and at the same time increases its quality.

A more specific object of the invention is to provide a chopper blade construction which can be assembled to its associated structure by a simple hand operation.

Another object of the invention is to provide a food chopper construction which eliminates all threaded joints thereby reducing the cost of manufacture and at the same time making the chopper more sanitary.

Further objects and advantages of the present invention will become apparent as the following description of an illustrative embodiment proceeds, taken in conjunction with the accompanying illustrative drawings in which:

Figure 1 is a front elevation of a food chopper in which the present invention finds utility.

Fig. 2 is a vertical cross section of the food chopper shown in Fig. 1 taken along section line 2—2 of Fig. 3.

Fig. 3 is a top view of the food chopper shown in Figs. 1 and 2.

Fig. 4 is a bottom view of the illustrative food chopper upper housing.

Fig. 5 is a partially broken perspective exploded view of the food chopper, handle shaft and blade assembly mechanism.

Fig. 6 is a sectional view similar to Fig. 2 but showing the blades in the lowered or extreme cutting position.

Fig. 7 is an enlarged sectional view of the drive shaft clutch housing.

Fig. 8 is an enlarged partial sectional view showing the drive shaft clutch assembly.

Fig. 9 is an enlarged sectional view of the drive shaft clutch assembly taken along section line 9—9 of Fig. 2.

Fig. 10 is a top view of the blade stripper assembly.

Fig. 11 is a perspective view of the convoluted blade construction.

Fig. 12 is an end view in enlarged scale of the blade shown in Fig. 11.

Fig. 13 is a perspective view of the blade support bar and drive shaft assembly.

Fig. 14 is a front elevation of the blade support bar and drive shaft assembly shown in Fig. 13.

Fig. 15 is an enlarged partial sectional view showing the assembled relationship of the blade support bar and the blade mounting notch.

The invention relates to the operative portions of a food chopper, and consequently will be best understood after the explanation of the environmental structure. Referring now to Fig. 1 it will be seen that the food chopper assembly 10 has a body 11 composed of an upper housing 12 and a lower housing 14. A chopper handle 15 is secured atop the chopping assembly shaft 16. A helical spring 18 is mounted co-axially surrounding the shaft 16 and abuts a spring mounting boss 19 on the top central portion of the upper housing 12.

Referring now to Fig. 2, it will be seen that a chopper blade assembly 20 is secured to the lower portion of the shaft 16 through a clutch assembly 21. The blades 22 are secured to a blade mounting cross bar 24 which in turn is fixed to the shaft 16. A stripper unit 25 rests within the lower housing 14, and serves to define a food area 26 as well as a means for stripping the blades 22 of any food which might cling to them during operation.

The operation of the unit will further assist in understanding the significance of the invention. Whatever food is desired to be chopped is placed upon a cutting board or similar substantial base. The chopper 10 is then placed over the material to be chopped so that the housing area 26 covers the food. The operator then strikes the handle 15 repeatedly, each stroke driving the blades 22 through the material to be chopped. The helical spring 18 drives the handle to the starting position after each stroke, and the clutch assembly 21 serves to rotate the blade assembly 20 so that the individual blades 22 attack the food from a different angle on each stroke.

After the chopper has served its purpose, it may be readily disassembled for cleaning by separating the upper housing 12 from the lower housing 14, and removing the blade stripper element 25, all of the elements then being separately washed.

As pointed out above the invention relates to the structural relationship between the various food choppers.

Referring now to Fig. 5 it will be seen that the chopping assembly includes the handle 15, the co-axial helical spring 18, the drive shaft 16, and the blade mounting bar 24, already described. The boss 29 in the base of the handle 15 has a bore 30 proportioned for a force fit with the slotted end of the shaft 16. The chamfer 28 permits the attachment of the shaft 16 to the handle 15 with a simple press fit. The handle 15 is preferably made of a hardened type of polyethylene to prevent cracking the boss 29 during the press fit, and its subsequent pounding in use.

The shaft 16 is secured to the cross bar 24 at its lower end by means of a mushroom headed coupler or mounting stud 31. The coupler 31 has an annular shoulder 32 and a stub shaft 34, the stub shaft 34 being proportioned to nest within the hollow central portion of the shaft 16. As will be seen in greater detail in Figs. 13 and 14, the shoulder 32 is spot welded to the cross bar 24.

Because the tolerance at the junction of the shaft and the coupler 31 is critical to the operation of the clutch assembly, it is important that no distortion be introduced by the attachment. To insure this result, the coupler is butt welded to the hollow shaft 16 and cross bar 14 as shown by the reference numeral 33 on Fig. 5. It has been found that unless dimensional tolerances of ±.001 of an inch are maintained between the clutch spring 60 and the shaft 16, the clutch will not operate satisfactorily. By using the unique stub shaft coupler 31 a single operation butt welds the shaft 16, coupler 31, and cross bar 24. This combined operation retains close dimensional tolerances and reduces cost as well. The shaft 16 is preferably formed of steel to reduce the probability of further wear in use.

Reference to Figs. 11 through 15 will assist in understanding the unique nature of the mechanism for fixing the cross bar 24 to the blade assembly 35. In Fig. 11, it will be seen that the blade assembly 35 contemplates a plurality of blade segments 22 having a lower cutting edge 36 which are joined at U-shaped end portions 38. The lower edge of the blades 36 is sharpened by conventional techniques to provide a cutting edge for engaging the materials to be chopped. A unique notch 40 is provided in the central upper portion of each of the blades 22. The notches are aligned on a single axis transverse of the blade assembly 35.

The detailed construction of the notch 40 is shown in Fig. 15. There it will be seen that the notch has a pair of side walls 41 and a base 42 defining a generally square notch 40. At a midpoint of each of the side walls 41, a cammed face 44 extends into the notch area and defines a locking shoulder 45. A plurality of elongated slots 46 are provided in the side walls 48 of the mounting bar 24. These slots 46 are so proportioned that their lower ends 49 abut the locking shoulder 45 of the cammed faces 44 in the notch 40. The length of the cammed face 44 is proportioned to nest within the mating slot 46. As will be seen in Fig. 14, the location of the slots 46 is staggered in order to mate with the opposed faces of the notches 40 which are necessarily at a diagonal in the blade assembly 35 as shown in Fig. 11.

By forming the cross bar 24 of a partially yieldable material which permits the legs 41 to bend inwardly from the base 50, the cross bar 24 can be assembled with the blade assembly 35 by a simple downward pressing motion. In manufacture the blade is held in a simple fixture, and then the support bar 24 and shaft 16 assembly is snapped into place. The locking shoulder 45 on the cammed face 44 abuts against the lower edge 49 of the slots 46 and securely fixes the blade assembly 35 to the cross bar 24. It will be appreciated that the method of assembly made possible by the structural relationship of the blade notches 40 and the cross bar slots 46 facilitates an inexpensive assembly as opposed to conventional techniques of deforming cross bar, spot welding and the like.

The clutch assembly 21 is also assembled in a unique simple manner. The clutch assembly contemplates a cupped boss 51 which is integral with the upper housing 12 of the chopper unit. Internally of the boss 51, as illustrated in Figs. 6 and 9, are a plurality of helical threads 52. The threads 52 engage the clutch dogs 54 which extend laterally from the clutch body 55 as illustrated in Figs. 5, 7 and 8.

The clutch body 55 has a hollow bore 56 with an enlarged base bore 58 defining a clutch spring mounting shoulder 59. For best results the clutch body should be molded of nylon or other material tough enough to resist distortion.

The clutch spring 60 is a tightly wound spring proportioned for a snug wrapped relationship with the shaft 16. A clutch spring mounting finger 61 extends from its lower portion and is operatively engaged by the clutch spring notch 62 at the lower portion of the clutch body 55. As best illustrated in Fig. 8, the clutch spring 60 rests on the annular shoulder 32 of the blade cross bar coupling 31 and abuts the clutch spring shoulder 59 and the clutch body 55. The clutch body 55 is held in place on the shaft 16 by a snap ring 62.

As will be seen in Fig. 5, the snap ring 62 is horseshoe shaped, having a pair of mounting holes 64 at the open ends. In the assembly, the mounting holes 64 are engaged by a reverse action pair of tongs which enlarges the center opening 65 of the snap ring so that it may be readily slipped over the shaft 16 into the position shown best in Fig. 8. The helix of the spring 60 is wound in such a direction as to permit rotation in one direction only. This action is coordinated in the directional orientation of the threads 52 within the clutch boss body 51 on the upper housing 12 to urge a continuous rotation of the blade assembly 35 as the unit is operated.

To further facilitate the unique assembly, and also permit ready disassembly for cleaning by the user, the upper housing 12 is secured to the lower housing 14 in a unique manner. As will be seen in Fig. 4, the upper housing carries a peripheral ring 66 presenting the lower shoulder 68 which abuts against the upper ring 69 of the lower housing 14. The lower end of the rim 70 of the upper housing rests upon the mounting shoulder 71 of the lower housing as illustrated in Fig. 2. Sufficient clearance is provided between the lower rim 70 of the upper housing 12 and the upper rim 72 of the lower housing 14 to accommodate the locking wedges 75 (see Fig. 4) which are provided around the periphery of the upper housing rim 70. The locking wedges 75 are so proportioned as to wedgingly expand the upper rim 72 of the lower housing 14 and compress the lower rim 70 of the upper housing 12 to removably secure the upper and lower housing for operation.

The stripper assembly 25, as will be seen in Fig. 10, is provided with a base portion 76 having a convoluted groove 78 to receive the convoluted blade assembly 35. Ribbing 79 may be provided to strengthen the base portion 76. The side wall 80 of the stripper assembly 25 is cylindrical in section, having an upper rim 81 which abuts against the inner surface 82 of the upper housing 12. At its lower portion, the stripper assembly 25 rests upon the stripper assembly supporting shoulder 84 provided in the lower housing 14.

In review, it will be observed that no threads are employed in assembling the various elements of the food chopper. The top 15 is press fitted, in the shaft 16, the clutch assembly 21 is secured on the shaft 16 by means of a snap ring 62, the shaft 16 is fixed to the blade support 24 by means of a coupler which may be simple and sturdily spot welded into place, and the blade assembly 35 is conveniently secured to the blade mounting cross bar 24 by a snap action locking fit with the unique mounting notches of the blade assembly 35.

When it is desired by the user to disassemble the food chopper for cleaning, the upper housing 12 is removed from the lower housing 14 by means of a pull sufficient to overcome the frictional lock against the locking wedges 75 on the upper housing 12. The stripper assembly 25 may then be readily removed from its position from the lower housing 14 so that all of the elements may be cleaned.

Although particular embodiments of the invention have been shown and described in full here, there is no intention to thereby limit the invention to the details of such embodiments. On the contrary, the intention is to cover all modifications, alternative embodiments, usages and equivalents of the food chopper as fall within the spirit and scope of the invention, specification, and appended claims.

I claim as my invention:

1. In a food chopper, a handle and blade assembly comprising, in combination, an elongate shaft, a channel shaped blade support having a back and two legs and a plurality of slots on the channel legs, a coupler securing the shaft to the blade support, a plurality of blades, each blade having a notched top, the notches having opposed cammed faces, the cammed faces being proportioned to nest within the blade support channel slots thereby securing the blades to the blade support.

2. In a food chopper, a handle and blade assembly comprising, in combination, an elongate tubular shaft, a channel shaped blade support having a back and two legs and a plurality of slots on the channel legs, a mushroom headed coupler with an annular shoulder and stub shaft, the stub shaft being fixed within the tubular shaft and the shoulder fixed to the blade support, a plurality of blades, each blade having a notched top, the notches having opposed cammed surfaces, the cams being proportioned to nest within the blade support channel slots thereby securing the blade to the blade support.

3. In a food chopper, a handle and blade assembly comprising, in combination, an elongate shaft, a channel shaped blade support having a back and two parallel legs and a plurality of slots on the channel legs, the shaft being secured to the blade support, a plurality of blades in a continuous convoluted assembly, each blade having a notched top, the notches being axially alined, each notch having opposed cammed faces, the cammed faces being proportioned to nest within the blade support channel slots thereby securing the blade to the blade support.

4. In a food chopper having a convoluted blade secured to a reciprocating shaft, a blade mounting assembly comprising, in combination, a cross bar secured transversely to the end of the shaft, the cross bar having a pair of parallel legs extending the distance across the convoluted blade, a plurality of slots in the legs axially parallel with the shaft, a plurality of notches axially alined on the convoluted blade, the notches being proportioned to receive the cross bar legs, and a pair of opposed inclined faces in the notches, the faces terminating in locking shoulders; the inclined faces, shoulders, and cross bar slots being proportioned for a locked relationship achieved by thrusting the cross bar legs into the blade notches until the locking shoulder engages the lower extremity of the slots.

5. In a food chopper having a convoluted blade secured to a reciprocated tubular shaft, a blade mounting assembly comprising, in combination, a cross bar, a stub shaft with an annular shoulder, the stub shaft secured within the chopper shaft and the annular shoulder secured to the crossbar, the crossbar having a pair of parallel legs extending the distance across the convoluted blade, a plurality of slots in the legs axially parallel with the shaft, a plurality of notches axially transverse of the convoluted blade, the notches being proportioned to receive the crossbar legs, and a pair of opposed inclined faces in the notches, the faces terminating in locking shoulders; the inclined faces, shoulders, and crossbar slots being proportioned for a locked relationship achieved by thrusting the crossbar legs into the blade notches until the locking shoulder engages the lower extremity of the slots.

References Cited in the file of this patent

FOREIGN PATENTS 935,749    Germany  --------------- Nov. 24, 1955